United States Patent
Mikami

(10) Patent No.: US 10,922,612 B2
(45) Date of Patent: Feb. 16, 2021

(54) INFORMATION PROCESSING APPARATUS AND INFORMATION PROCESSING METHOD

(71) Applicant: Sony Corporation, Tokyo (JP)

(72) Inventor: Hiroaki Mikami, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/761,263

(22) PCT Filed: Nov. 21, 2018

(86) PCT No.: PCT/JP2018/042950
§ 371 (c)(1),
(2) Date: May 4, 2020

(87) PCT Pub. No.: WO2020/054083
PCT Pub. Date: Mar. 19, 2020

(65) Prior Publication Data
US 2020/0372343 A1    Nov. 26, 2020

(30) Foreign Application Priority Data

Sep. 11, 2018  (JP) .................. 2018-169979

(51) Int. Cl.
*G06N 3/08*        (2006.01)
*G06K 9/62*        (2006.01)
*G06T 1/20*        (2006.01)

(52) U.S. Cl.
CPC ............. *G06N 3/08* (2013.01); *G06K 9/6262* (2013.01); *G06T 1/20* (2013.01)

(58) Field of Classification Search
CPC ............ G06N 3/08; G06T 1/20; G06K 9/6262
See application file for complete search history.

(56) References Cited

U.S. PATENT DOCUMENTS

2018/0144261 A1   5/2018 Wnuk et al.
2019/0114537 A1*  4/2019 Wesolowski ............. G06N 3/08
(Continued)

FOREIGN PATENT DOCUMENTS

JP     03-223933 A    10/1991
JP     2001-056802 A   2/2001

OTHER PUBLICATIONS

Smith, "Dont decay the learning data, increase the batch size" (Year: 2018).*

(Continued)

*Primary Examiner* — Dhaval V Patel
(74) *Attorney, Agent, or Firm* — Xsensus LLP

(57) ABSTRACT

[Problem] Effectively speeding up the learning using the DNN regardless of a learning technique.
[Solution] An information processing apparatus is provided, which includes a learning unit that executes learning using a neural network, and the learning unit dynamically changes the value of the batch size during learning based on the gap value with the ideal state for learning output from the neural network. Furthermore, an information processing method is provided, which includes executing, by a processor, learning using a neural network, and the learning further includes dynamically changing the value of the batch size during learning based on the gap value with the ideal state for learning output from the neural network.

16 Claims, 17 Drawing Sheets

(56) References Cited

U.S. PATENT DOCUMENTS

2020/0035222 A1* 1/2020 Sypniewski ............ G10L 15/16
2020/0143240 A1* 5/2020 Baker ..................... G06N 3/04

OTHER PUBLICATIONS

International Search Report and Written Opinion dated Feb. 12, 2019 for PCT/JP2018/042950 filed on Nov. 21, 2018, 8 pages including English Translation of the International Search Report.

Ninomiya, H., "Improved online quasi-Newton Method for Training of Neural Networks," IEICE Technical Report NLP2009-81-NLP2009-125 Nonlinear Problems, Japan, Institute of Electronics, Information and Communication Engineers, Nov. 4, 2009, vol. 109, No. 269, pp. 187-192.

Notification of Decision to Grant a Patent received for Japanese Patent Application No. 2018-169979, dated Dec. 25, 2018, 6 pages including English Translation.

* cited by examiner

FIG.9

```
Training script
while until convergence
    // learning process for 1 iter
    ...
    if loss gradient acquisition API() < threshold:
        increase batch size
    ...
```
~ TS1

```
Loss gradient calculation module
loss_prev = loss
loss = 0.9 * loss_prev + 0.1 * <current value of loss>
    // calculate moving average of loss to remove noise (not essential)
loss_grad = loss - loss_prev // calculate gradient
```
~ CM

FIG.12

```
Training script
while until convergence
    // learning process for 1 epoch
    ...
    if loss gradient acquisition API() < threshold1: // start to automatically increase batch size when gradient is less than certain
        if loss acquisition API() - loss_prev< threshold2: // stop automatic increase when loss is increased
            batch size /= 2
            reload model of DNN in previous epoch
        batch size *= 2
        loss_prev = current value of loss
```
~ TS2

INFORMATION PROCESSING APPARATUS AND INFORMATION PROCESSING METHOD

CROSS-REFERENCE TO RELATED APPLICATIONS

The present application is based on PCT filing PCT/JP2018/042950, filed Nov. 21, 2018, which claims priority to JP 2018-169979, filed Sep. 11, 2018, the entire contents of each are incorporated herein by reference.

FIELD

The present disclosure relates to an information processing apparatus and an information processing method.

BACKGROUND

In recent years, a neural network, which is a mathematical model representing the mechanism of a cerebral nervous system, has received attention. Furthermore, many techniques for increasing the speed of learning using a neural network have been proposed. For example, Non Patent Literature 1 discloses a technique for changing a batch size during learning.

CITATION LIST

Non Patent Literature

Non Patent Literature 1: Samuel L. Smith, and three other persons, "Don't Decay the Learning Rate, Increase the Batch Size", Nov. 1, 2017, [Online], [Searched on Sep. 7, 2018], Internet <https://arxiv.org/pdf/1711.00489.pdf>

SUMMARY

Technical Problem

Unfortunately, the technique disclosed in Non Patent Literature 1 depends on a specific learning technique, and it is difficult to apply it to learning that does not adopt the technique.

Solution to Problem

According to the present disclosure, an information processing apparatus is provided that includes: a learning unit that executes learning using a neural network, wherein the learning unit dynamically changes a value of a batch size during learning based on a gap value with an ideal state for learning output from the neural network.

Moreover, according to the present disclosure, an information processing method is provided that includes: executing, by a processor, learning using a neural network, wherein the learning further includes dynamically changing a value of a batch size during learning based on a gap value with an ideal state for learning output from the neural network.

BRIEF DESCRIPTION OF DRAWINGS

FIG. 9 is a diagram illustrating an example of a training script and a loss gradient calculation module for changing a batch size based on a first differential value of the loss according to the embodiment.

FIG. 12 is a diagram illustrating an example of a training script for increasing or decreasing the batch size based on a loss and an epoch according to the embodiment.

DESCRIPTION OF EMBODIMENTS

Figure 1:
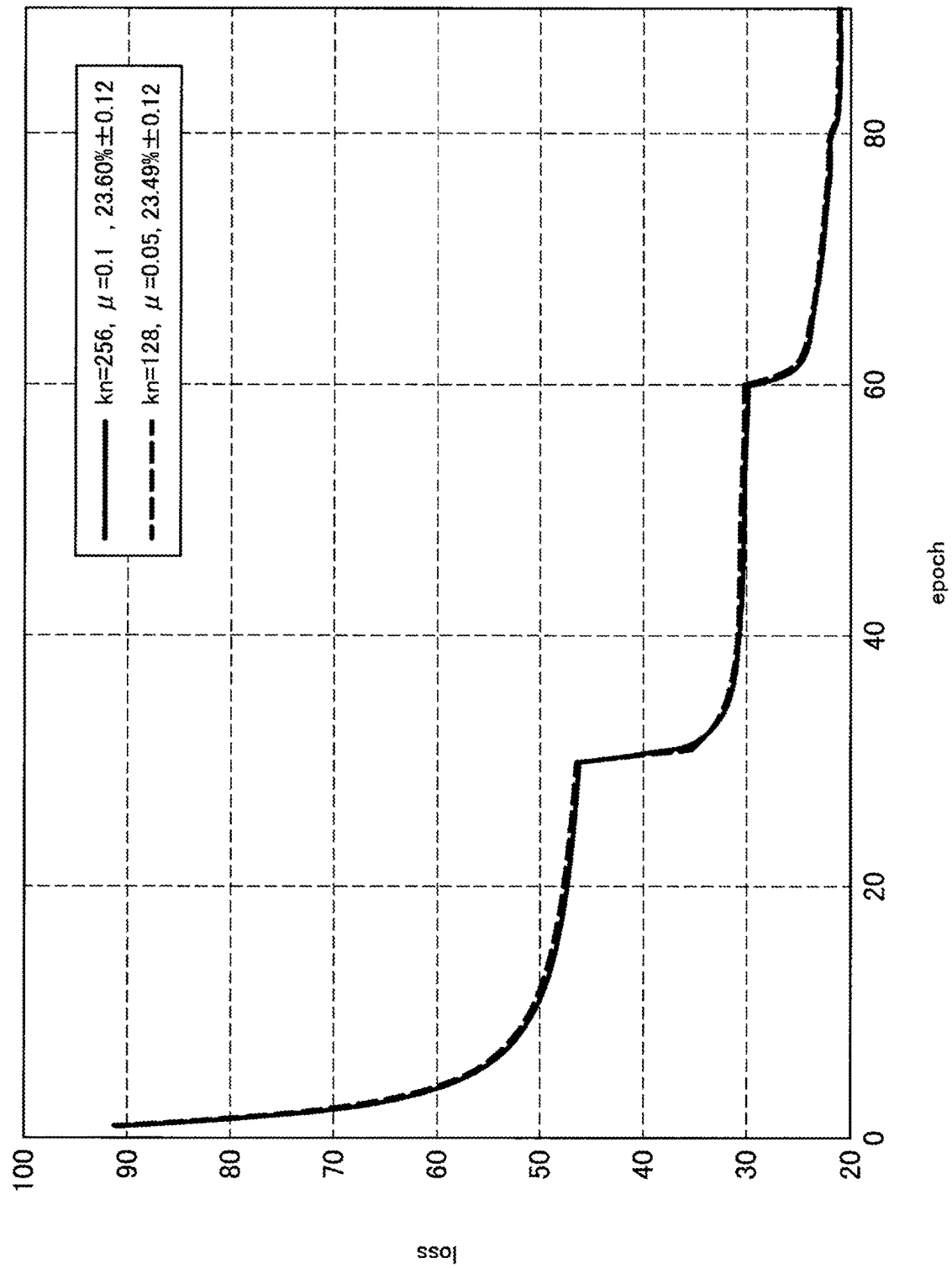
FIG. 1 is a graph illustrating an example of the transition of a loss in a case where Step Learning rate decay is applied.

Preferred embodiments of the present disclosure are described below in detail with reference to the accompanying drawings. Here, in the description and the drawings, components having substantially the same functional configuration are denoted by the same reference numeral, and redundant descriptions are omitted.

Furthermore, descriptions are given in the following order.

1. Embodiment
 1.1. Overview
 1.2. Example of the functional configuration of an information processing apparatus 10
 1.3. Verification result
 1.4. Implementation technique for increasing/decreasing a batch size 2. Example of hardware configuration
3. Conclusion

1. Embodiment

<<1.1. Overview>>

First, the overview of one embodiment of the present disclosure is described. As described above, in recent years, many techniques for increasing the speed of learning using a neural network have been proposed. Generally, as the time needed for DNN (Deep Neural Network) learning is proportional to the number of parameter updates, a reduction in the number of updates may be an effective way for increasing the speed of learning.

The number of parameter updates may be reduced by, for example, increasing a batch size. Further, it is known that, in the latter half of learning, the learning converges even if the batch size is increased; therefore, as disclosed in for example Non Patent Literature 1, the batch size is changed during learning to set a batch size as large as possible, whereby the number of parameter updates may be reduced, and accordingly the effect of speeding-up of learning may be expected.

Unfortunately, the method for changing a batch size disclosed in Non Patent Literature 1 is a method that may be applied only to a specific learning technique. Here, the above-described specific learning technique refers to the technique called Step Learning rate decay.

FIG. 1 is a graph illustrating an example of the transition of a loss (loss) in a case where Step Learning rate decay is applied. As illustrated in FIG. 1, Step Learning rate decay is a technique for reducing the loss in a stepwise fashion by decreasing the learning rate in a stepwise fashion. Referring to the example illustrated in FIG. 1, it is understood that the loss is largely reduced near epochs 30 and 60 and the graph has a stepwise form.

According to the technology disclosed in Non Patent Literature 1, it is possible to change the batch size at timing such as the epochs 30 and 60 at which the loss largely decreases; however, it is not applicable to a learning technique in which the transition of the loss does not exhibit the above-described stepwise form.

The technical idea according to the present disclosure has been developed with a focus on the above-described point so as to effectively speed up the learning using the DNN regardless of a learning technique. Thus, one of the features of the information processing apparatus 10 according to one embodiment of the present disclosure is that it includes a learning unit 120 that executes learning using a neural network and the learning unit 120 dynamically changes the value of the batch size during learning based on the gap value with the ideal state for learning output from the neural network.

Here, the gap value with the above-described ideal state may be the index quantitatively representing the difference between the expected output and the actual output. The gap value with the ideal state according to the present embodiment includes, for example, a loss. Furthermore, the gap value with the ideal state according to the present embodiment may include a training error or a validation error.

Furthermore, examples of the training error and the variation error used as the above-described gap value include a mean square error (MSE: Mean Square Error) or a mean absolute error (MAE: Mean Absolute Error), which may be used as a loss, Top-k-error (particularly, top-1-error, top-5-error, etc.), which is used for image classification, and mAP (mean Average Precision) used for object detection.

Figure 2:
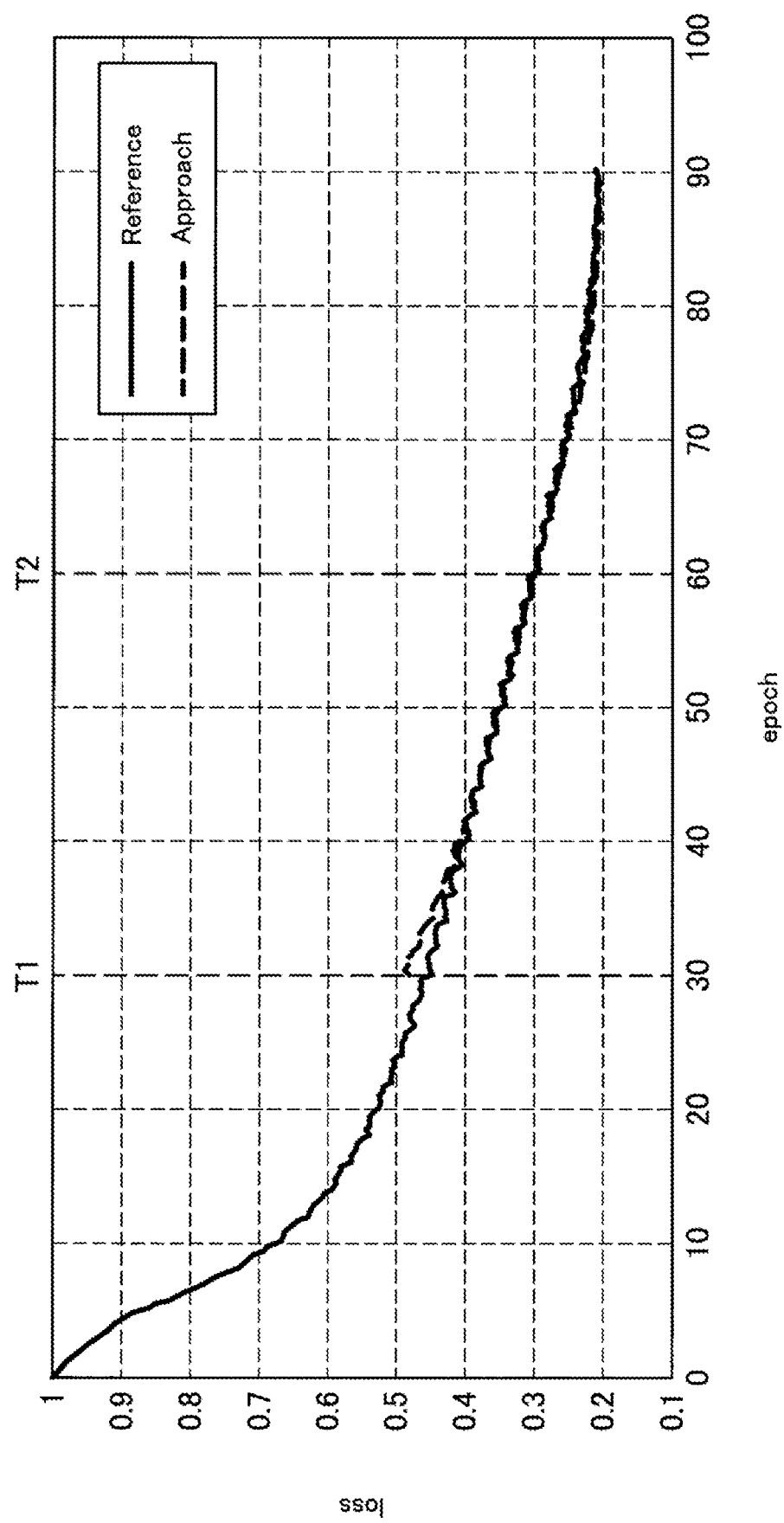
FIG. 2 is a graph illustrating the overview of batch size change according to an embodiment of the present disclosure.

Here, the overview of the batch size change according to the present embodiment is described with reference to FIG. 2. FIG. 2 illustrates a graph representing the transition of the loss with the progress of epochs. Here, in each graph illustrated in FIG. 2 and subsequent figures, a solid line indicates the transition (Reference) in the loss without a batch size change, and a broken line indicates the transition (Approach) of the loss to which a batch size change according to the present embodiment is applied.

The learning unit 120 according to the present embodiment may increase the value of the batch size during learning in a case where, for example, the convergence of learning is expected based on the loss.

A smaller loss value indicates the DNN approaching a solution, i.e., the convergence of learning (learning stabilization). Therefore, the learning unit 120 according to the present embodiment may increase the value of the batch size during learning based on the n-th differential value of the loss.

For example, the learning unit 120 according to the present embodiment may increase the value of the batch size when the first differential value of the loss, i.e., the gradient falls below a predetermined threshold. In the case of the example illustrated in FIG. 2, the learning unit 120 increases the value of the batch size from 32K to 64K at timing T1 (the epoch 30) at which the gradient of the loss is stable.

Moreover, for example, the learning unit 120 according to the present embodiment may increase the value of the batch size when the 0-th differential value of the loss, i.e., the value of the loss itself falls below a predetermined threshold. Here, when the above-described threshold is 0.3, the learning unit 120 may increase the value of the batch size at timing T2 (the epoch 60) at which the value of the loss falls below 0.3. Moreover, the learning unit 120 may increase the value of the batch size based on the n-th differential value where n>2.

Here, when Approach and Reference are compared with each other, it is understood that the performance is maintained without divergence of the learning even when the batch size changing method according to the present embodiment is applied. That is, with the batch changing method implemented by the information processing apparatus 10 according to the present embodiment, it is possible to maintain the learning performance and also reduce the number of parameter updates, that is, reduce the learning time.

Furthermore, with the batch changing method according to the present embodiment, even if the learning technique has the transition of the loss that does not exhibit a stepwise form, as illustrated in FIG. 2, the batch size may be increased and the learning time may be reduced. Thus, with the information processing apparatus 10 according to the present embodiment, it is possible to effectively speed up learning using the DNN regardless of a learning technique.

<<1.2. Example of the Functional Configuration of the Information Processing Apparatus 10>>

Figure 3:
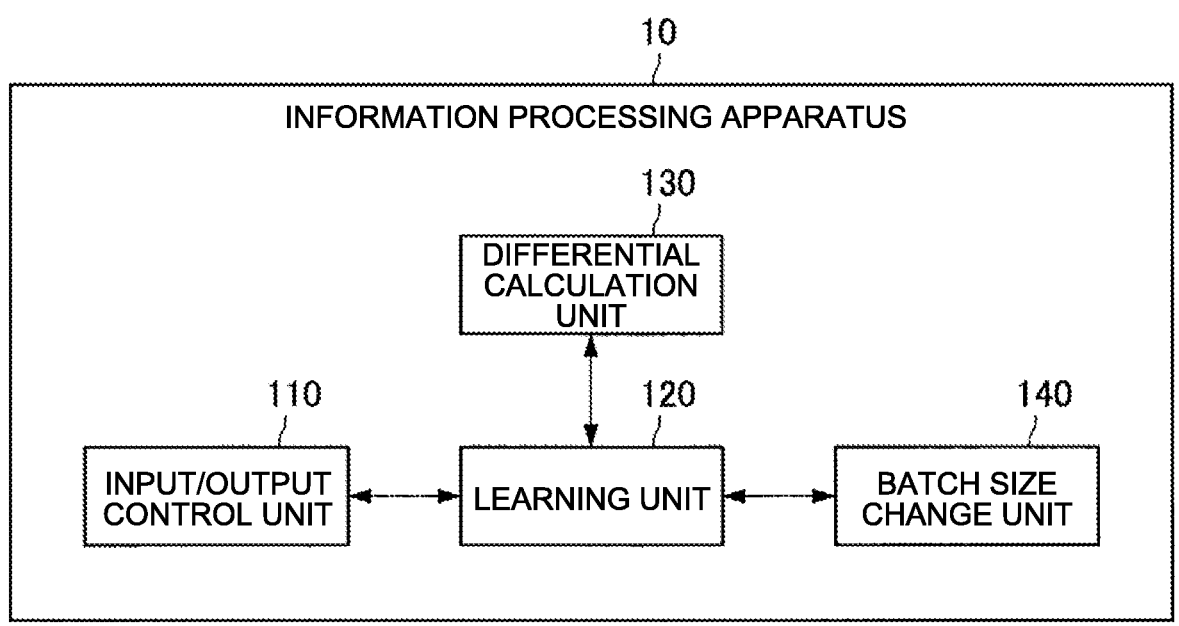
FIG. 3 is a block diagram illustrating an example of the functional configuration of an information processing apparatus according to the embodiment.

Next, an example of the functional configuration of the information processing apparatus 10 according to the present embodiment is described. FIG. 3 is a block diagram illustrating an example of the functional configuration of the information processing apparatus 10 according to the present embodiment. With reference to FIG. 3, the information processing apparatus 10 according to the present embodiment includes an input/output control unit 110, the learning unit 120, a differential calculation unit 130, and a batch size change unit 140.

(The Input/Output Control Unit 110)

The input/output control unit 110 according to the present embodiment controls a user interface related to the DNN learning. For example, the input/output control unit 110 according to the present embodiment transfers various data input via an input device to the learning unit 120. Furthermore, for example, the input/output control unit 110 transfers the value output from the learning unit 120 to an output device.

(The Learning Unit 120)

The learning unit 120 according to the present embodiment performs learning using the DNN. As described above, one of the features of the learning unit 120 according to the present embodiment is to dynamically change the value of the batch size during learning based on the gap value with the ideal state for learning output from the DNN. The gap value with the ideal state according to the present embodiment includes, for example, a loss, a training error, or a validation error.

(The Differential Calculation Unit 130)

The differential calculation unit 130 according to the present embodiment performs the n-th differential process on the loss input from the learning unit 120 to calculate the n-th differential value and outputs the n-th differential value to the learning unit 120.

(The Batch Size Change Unit 140)

The batch size change unit 140 according to the present embodiment provides the function to control an increase/decrease in the batch size based on the value of the batch size set by the learning unit 120. Details of a function provided in the batch size change unit 140 according to the present embodiment are described separately later.

An example of the functional configuration of the information processing apparatus 10 according to the present embodiment has been described above. Furthermore, the configuration described above with reference to FIG. 3 is merely an example, and the functional configuration of the information processing apparatus 10 according to the present embodiment is not limited to this example. The functional configuration of the information processing apparatus 10 according to the present embodiment may be flexibly modified according to specifications and operations.

<<1.3. Verification Result>>

Next, a verification result of the batch size changing method implemented by the information processing apparatus 10 according to the present embodiment is described.

Figure 4:
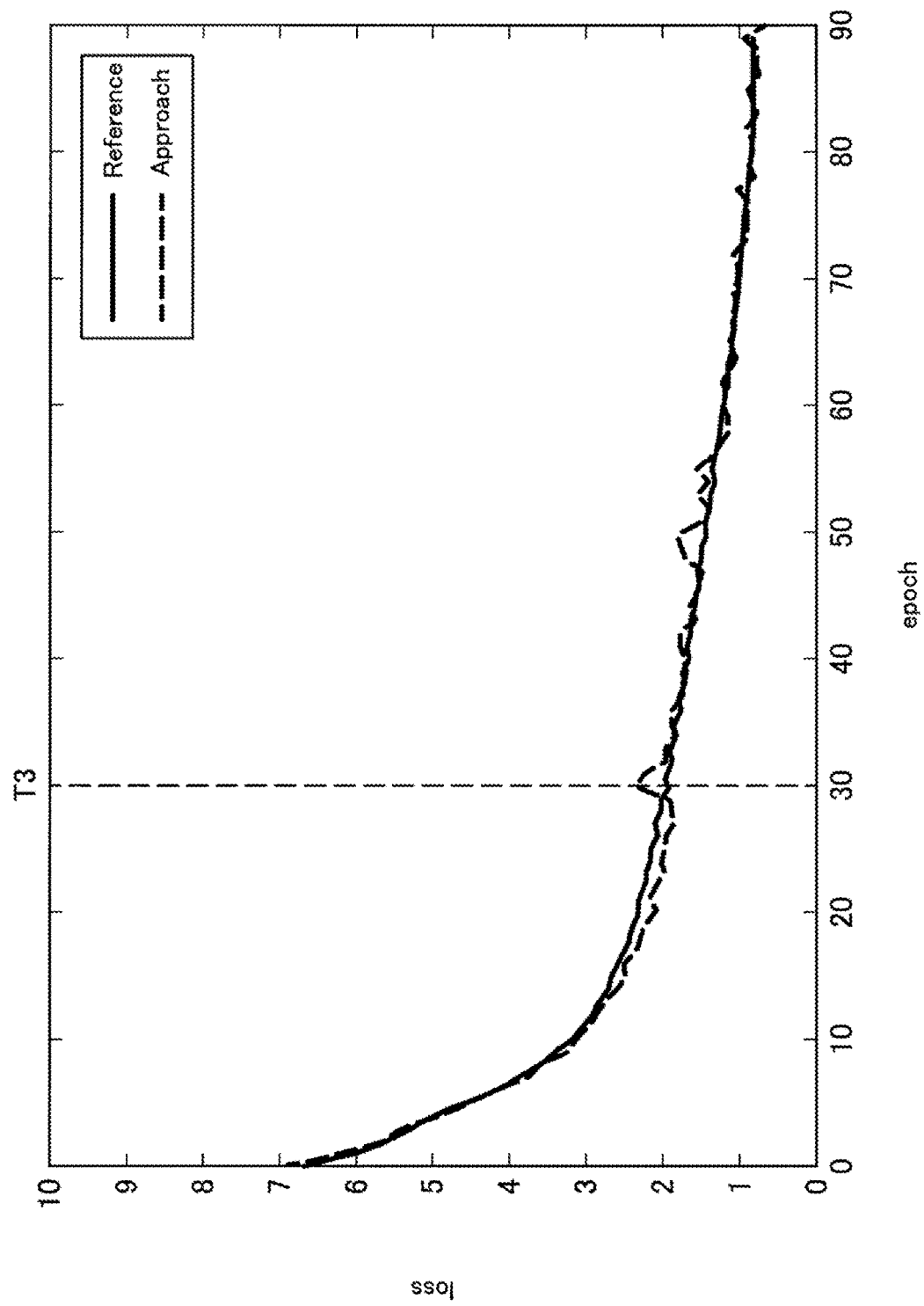
FIG. 4 is a graph illustrating a verification result when the batch size change based on the gradient of the loss according to the embodiment is applied to ImageNet/ResNet-50.

First, a verification result in a case where ImageNet is used as a dataset and ResNet-50 is used as the DNN is described. FIG. 4 is a graph illustrating a verification result when the batch size change based on the gradient of the loss according to the present embodiment is applied to ImageNet/ResNet-50.

Here, learning was performed with the batch size in Reference fixed at 32K. On the other hand, in Approach, the batch size was increased from 32K to 68K at timing T3 (the epoch 30) at which the first differential value of the loss, that is, the gradient fell below the threshold, and the learning was continued.

When Reference and Approach are compared with each other, it is understood that, even when the batch size is increased by using the batch changing method according to the present embodiment, the convergence of the loss is not largely affected.

Figure 5:
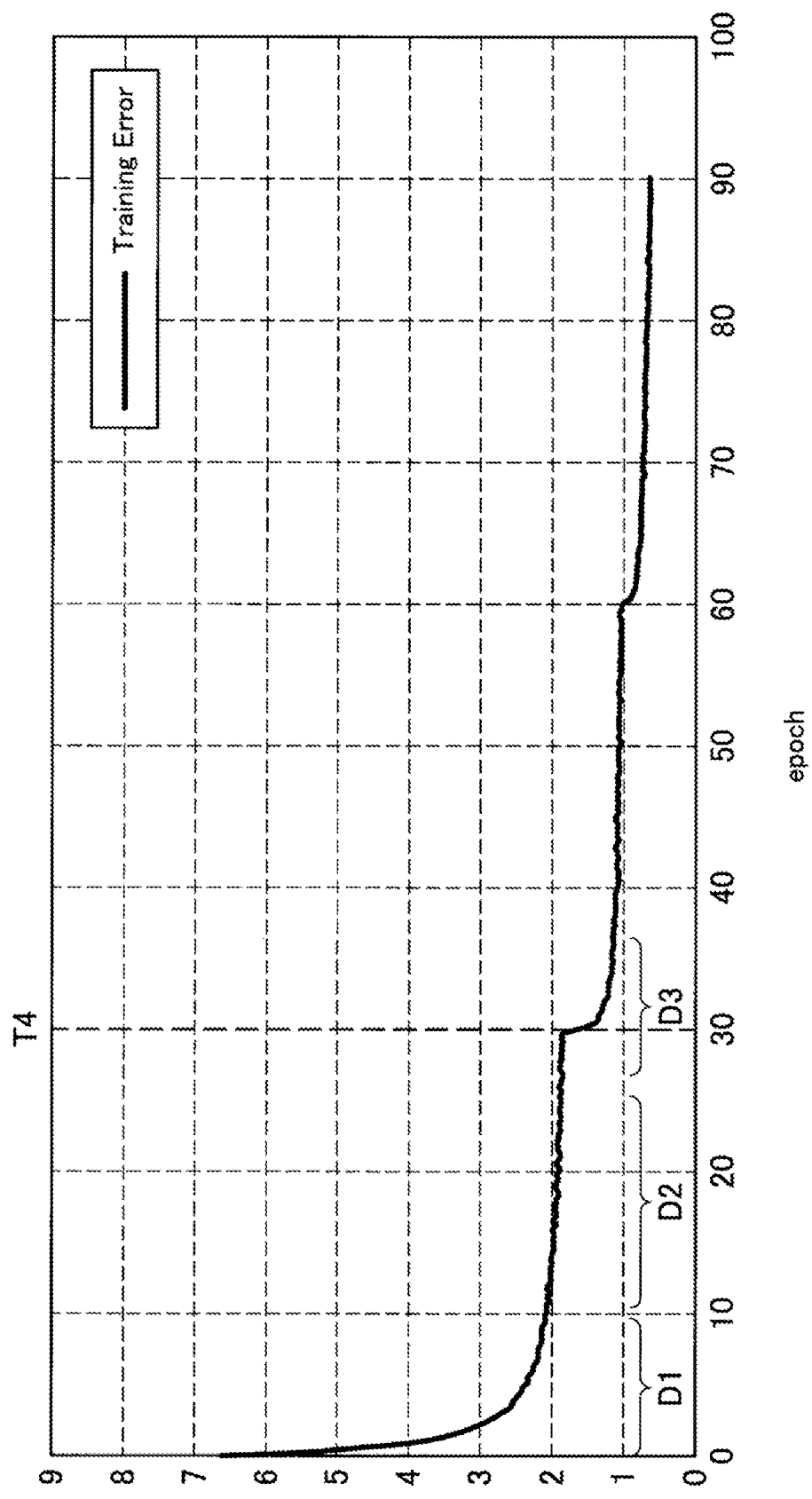
FIG. 5 is a graph illustrating a verification result when the batch size change based on a training value according to the embodiment is applied to ImageNet/ResNet-50.

Furthermore, FIG. 5 is a graph illustrating a verification result when the batch size change based on a training value according to the present embodiment is applied to Image Net/ResNet-50.

Here, the batch size was increased from 2K to 20K at timing T4 (the epoch 30) at which the 0-th differential value of the training error fell below the threshold of 1.8 and the learning was continued.

With reference to FIG. 5, it is understood that, even when the batch size is increased based on the 0-th differential value of the training error, the learning is converged without any effect.

Figure 6:
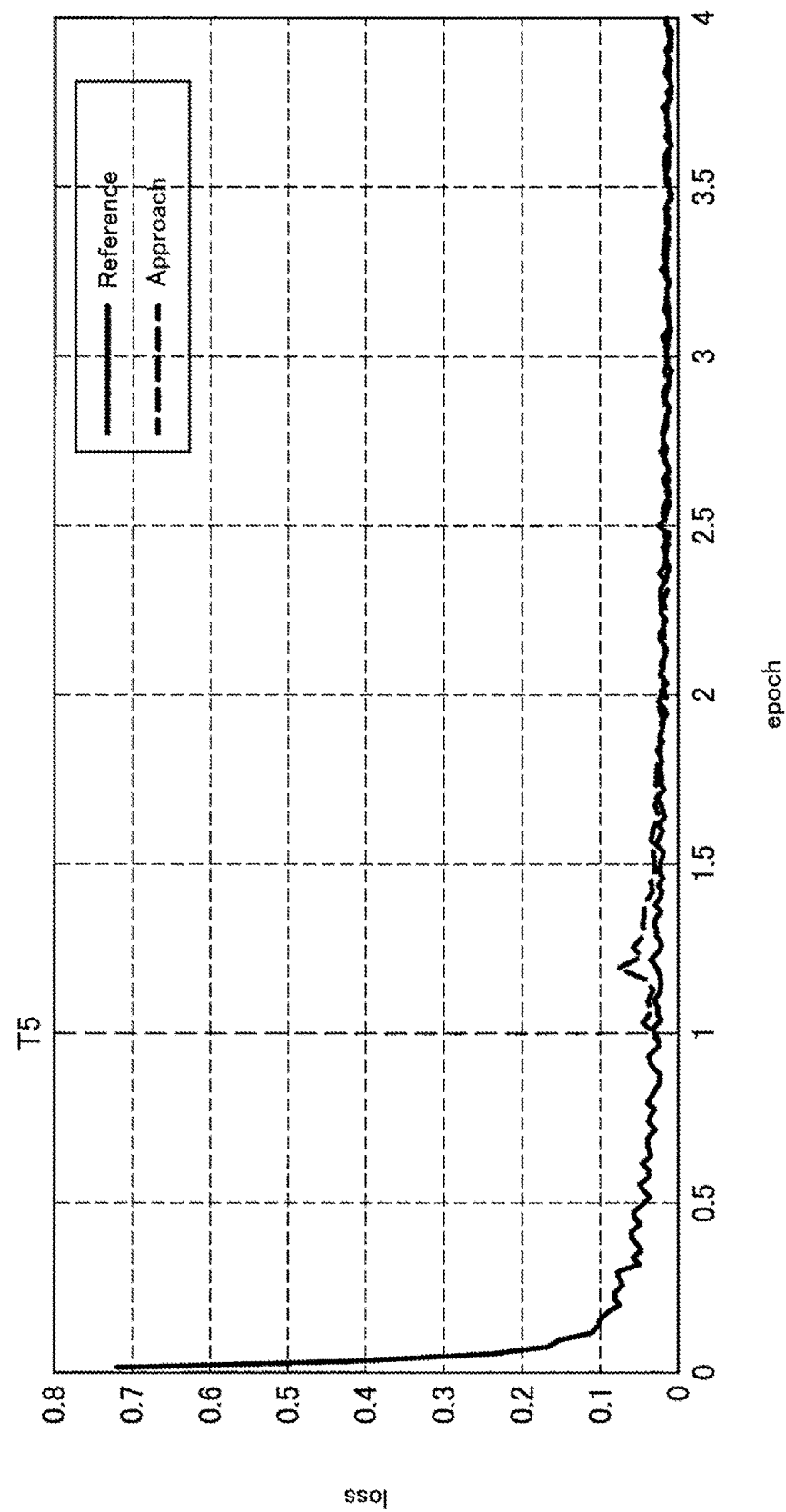
FIG. 6 is a graph illustrating a verification result when the batch size change based on the loss according to the embodiment is applied to learning using MNIST.

Next, a verification result in a case where MNIST is used as a dataset is described. FIG. 6 is a graph illustrating a verification result when the batch size change based on the loss according to the present embodiment is applied to the learning using MNIST.

Here, the learning was performed with the batch size in Reference fixed at 128. On the other hand, in Approach, the batch size was increased from 128 to 3072 at timing T5 (epoch 1) at which the first differential value of the loss fell below the threshold and the 0-th differential value of the loss fell below the threshold of 0.03, and the learning was continued.

As a result of the above-described control, the number of parameter updates may be reduced from 2000 to 560, and the learning time may be significantly reduced.

Figure 7:
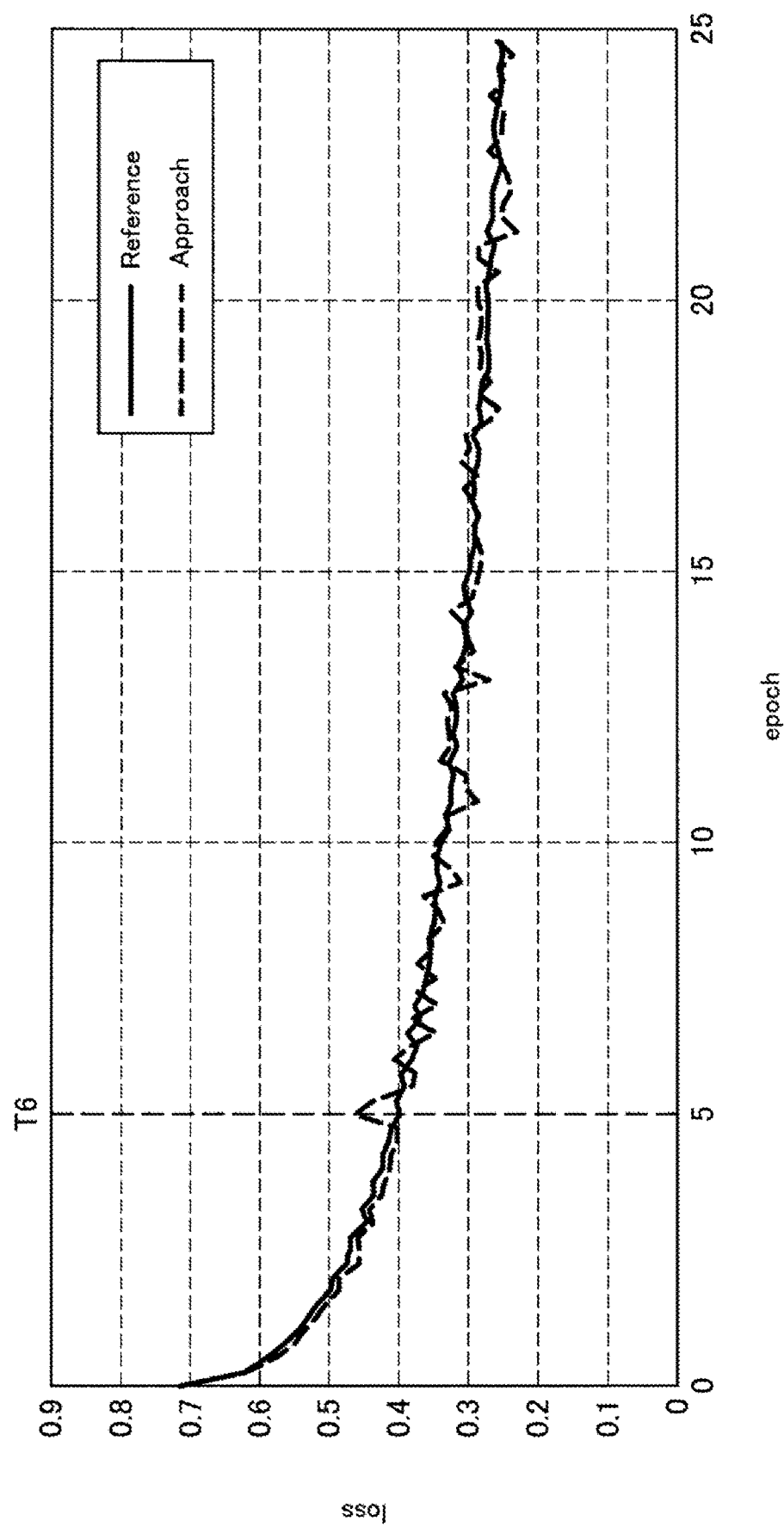
FIG. 7 is a graph illustrating a verification result when the batch size change based on the loss according to the embodiment is applied to learning using cifar10.
Figure 8:
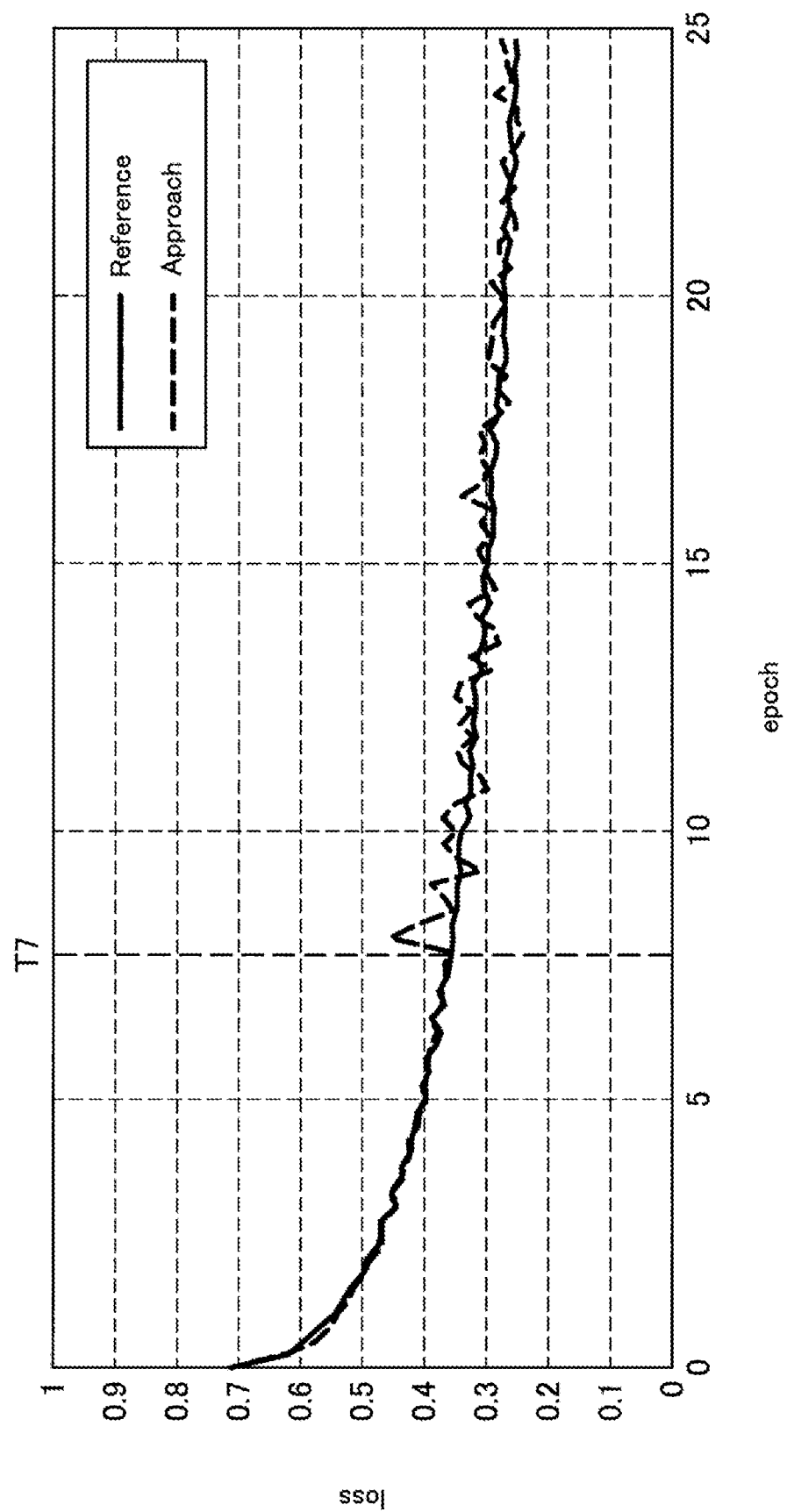
FIG. 8 is a graph illustrating a verification result when the batch size change based on the loss according to the embodiment is applied to learning using cifar10.

Next, the verification result in a case where cifar10 is used as a dataset is described. FIG. 7 and FIG. 8 are graphs illustrating verification results when the batch size change based on the loss according to the present embodiment is applied to the learning using cifar10.

In the verification according to FIG. 7, the learning was performed with the batch size in Reference fixed at 64. On the other hand, in Approach, the batch size was increased from 64 to 1024 at timing T6 (Epoch 5) at which the first differential value of the loss fell below the threshold and the 0-th differential value of the loss fell below the threshold of 0.35, and the learning was continued.

As a result of the above control, the number of parameter updates may be reduced from 20000 to 5000, and the learning time may be significantly reduced.

Furthermore, in the verification according to FIG. 8, in the same manner as in the verification according to FIG. 7, the learning was performed with the batch size in Reference fixed at 64. On the other hand, in Approach, the batch size was increased from 64 to 1024 at timing T7 (epoch 8) at which the 0-th differential value of the loss fell below the threshold of 0.35 and the learning was continued.

As a result of the above-described control, the number of parameter updates may be reduced from 20000 to 7250, and the learning time may be significantly reduced.

The verification result of the batch size changing method according to the present embodiment has been described above. The above-described verification results indicate that, when the batch size changing method according to the present embodiment is applied, the number of parameter updates may be reduced by approximately ⅓ to ¼ with substantially no effect on the performance. As described above, with the information processing apparatus 10 according to the present embodiment, it is possible to effectively speed up the learning using the DNN regardless of the learning technique.

Furthermore, the batch size based on the first differential value of the loss may be changed by, for example, a training script TS1 and a loss gradient calculation module CM illustrated in FIG. 9. Moreover, pseudo codes are illustrated in FIG. 9.

In the case of the example illustrated in FIG. 9, in the training script TS1, first, an invoking process for a loss gradient acquisition API, that is, the loss gradient calculation module CM is executed, and the current value of loss_grad is acquired as a return value.

Then, a process is performed to compare the acquired value of loss_grad and the threshold, and here, when the value of loss_grad falls below the threshold, a process is performed to increase the batch size.

In the training script TS1, each of the above-described processes is repeatedly executed until the learning is converged.

Furthermore, after the loss gradient calculation module CM is invoked by the training script TS1, the stored value of loss is saved to loss_prev, and the difference between the newly acquired loss and loss_prev is obtained so that loss_grad is calculated. Here, in the loss gradient calculation module CM, a process may be performed to calculate the moving average of the loss so as to remove noise, as illustrated in the figure.

Although a case where the batch size is increased is described above as a primary example, the learning unit 120 according to the present embodiment may decrease the value of the batch size during learning when the divergence of the learning is expected based on the loss.

For example, in the case of the example illustrated in FIG. 5, as the learning is still unstable during a period D1, the learning unit 120 maintains the small value of the batch size given as the default value. Conversely, when the learning is stable in a period D2, the learning unit 120 may increase the value of the batch size.

In Step learning rate decay, however, generally, the loss largely decreases immediately after the learning rate is lowered, and thus it is expected that the divergence of the learning is likely to occur as compared with that before the learning rate is lowered. For this reason, the learning unit 120 according to the present embodiment may increase the value of the batch size once in the period D2 and then decrease it in a period D3 so as to achieve the convergence of learning. Here, the learning unit 120 may set, for example, the value of the batch size that falls between those in the period D1 and the period D2.

Next, changing the batch size based on an epoch according to the present embodiment is described. In the learning using the DNN, when the learning rate does not decrease, there is a strong tendency that the learning becomes easier as the learning further progresses, that is, as epochs further progress. Therefore, the learning unit 120 according to the present embodiment may increase the value of the batch size in accordance with the progress of epochs. For example, the learning unit 120 according to the present embodiment may increase the value of the batch size in each epoch.

Figure 10:
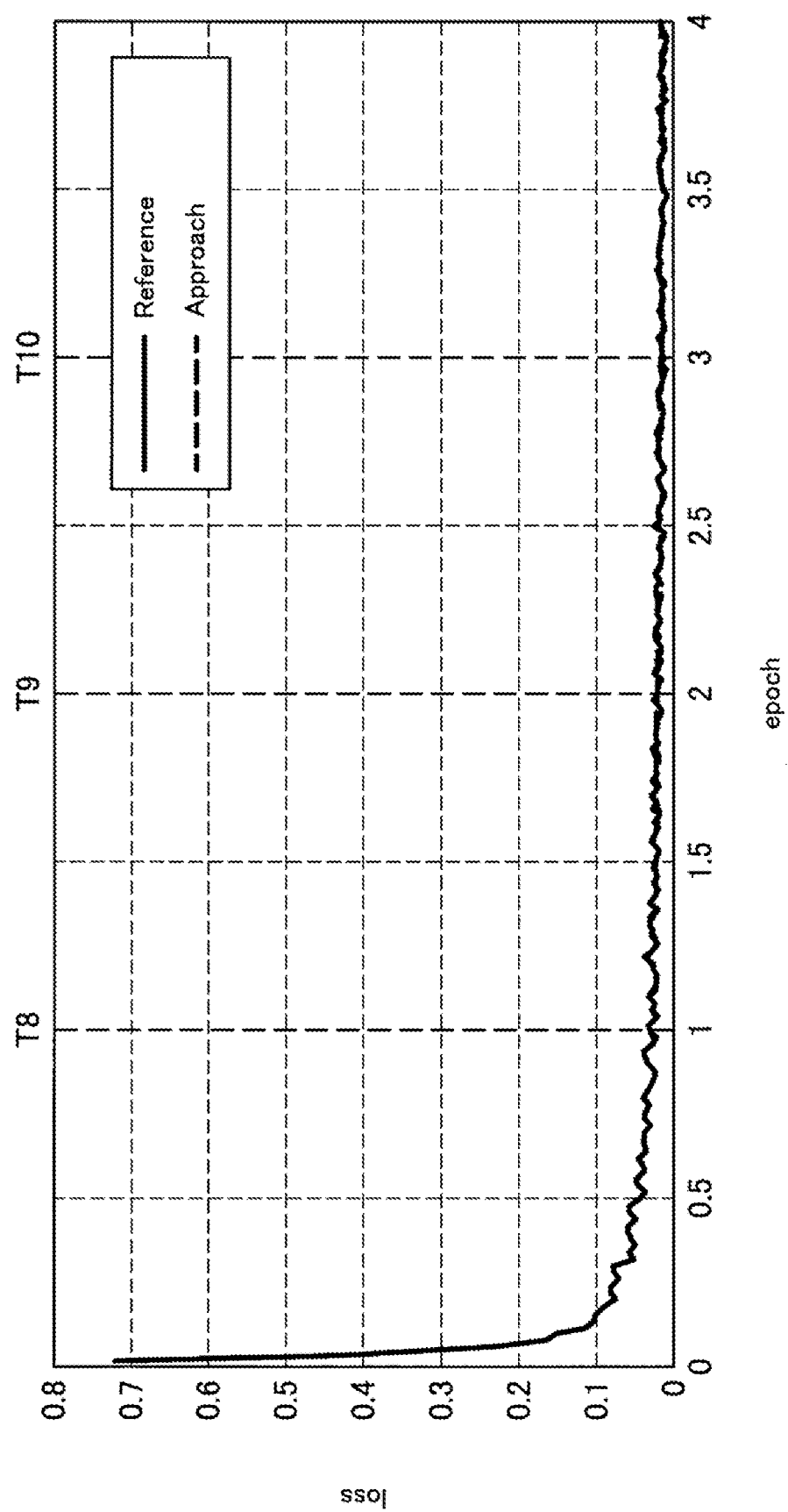
FIG. 10 is a graph illustrating a verification result when the batch size increase in each epoch according to the embodiment is applied to learning using MNIST.

FIG. 10 is a graph illustrating a verification result when the batch size increase in each epoch according to the present embodiment is applied to the learning using MNIST. Here, the default value of the batch size was set to 128, and a control was performed to double the batch size to 256 in the epoch 1 (timing T8), the batch size to 512 in epoch 2 (timing T9), and the batch size to 1024 in the epoch 3 (timing T10).

As a result of the above-described control, the number of parameter updates may be reduced from 2000 to 938. According to the verification result, it is understood that, even when the batch size is increased in each epoch, the convergence of the loss is not largely affected, and the learning time may be significantly reduced.

Further, when the divergence of learning is expected as a result of the increase in the value of the batch size based on a loss or an epoch, the learning unit 120 according to the present embodiment reloads the network model before the divergence, i.e., in the previous epoch so as to achieve the convergence of the learning.

Figure 11:
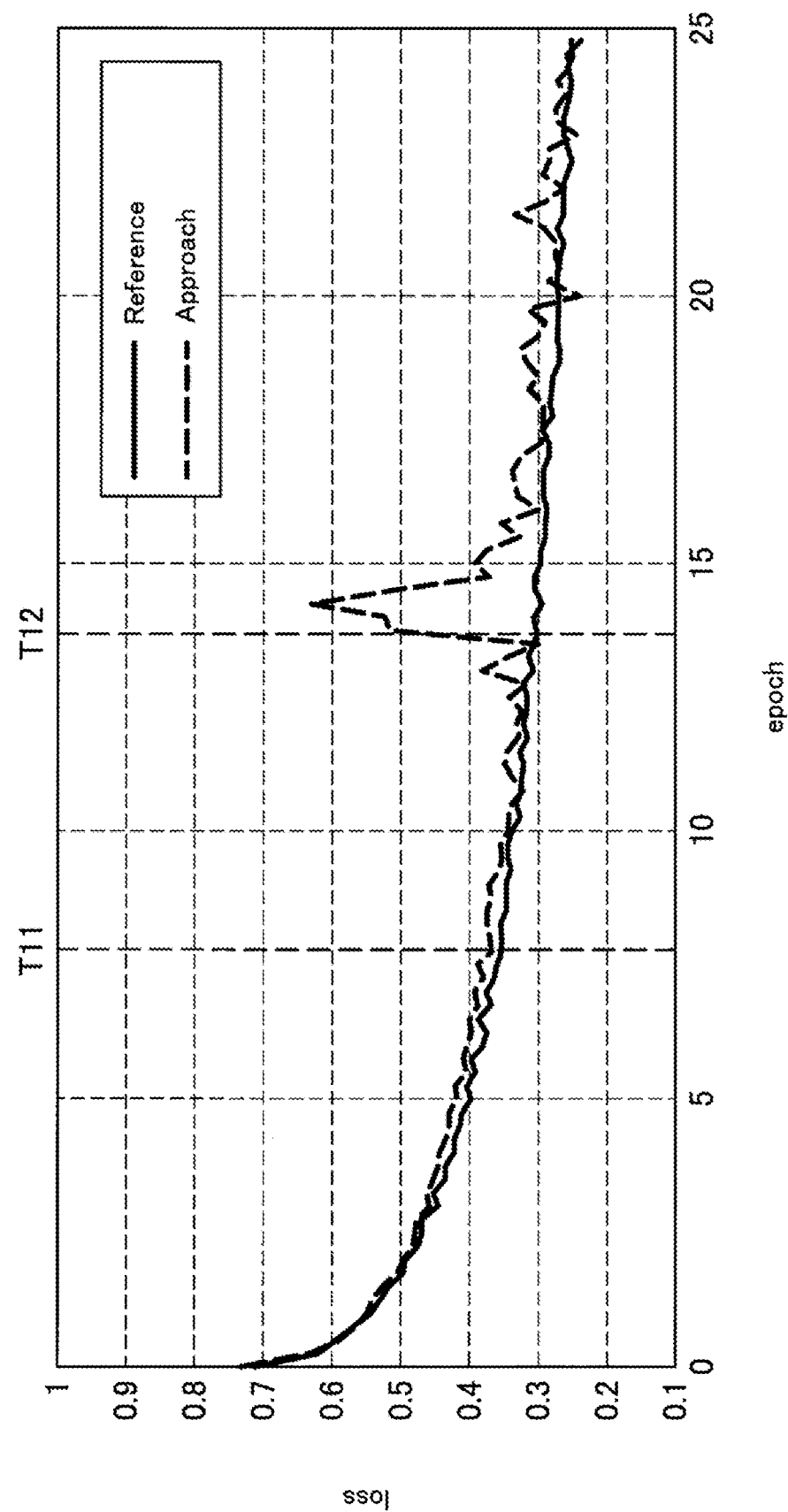
FIG. 11 is a graph illustrating a verification result when the batch size change based on a loss and an epoch according to the embodiment is applied to learning using cifar10.

FIG. 11 is a graph illustrating a verification result when the batch size change based on a loss and an epoch according to the present embodiment is applied to the learning using cifar10.

Here, the initial value of the batch size was set to 64, and the threshold for the 0-th differential value of the loss was set to 0.35. In the example illustrated in FIG. 11, the process to increase the batch size was started based on the fact that the loss fell below the threshold of 0.35 in the epoch 8 (timing T11), and then the batch size was increased in each epoch.

Then, in epoch 14 (timing T12), when the batch size was increased to 4K, the divergence of learning was expected. Therefore, the learning unit 120 according to the present embodiment stopped increasing the value of the batch size at the start time of epoch 15, reloaded the model at the start time of the epoch 14, and then continued the learning while the value of the batch size was fixed at 2K.

When the learning unit 120 according to the present embodiment reloads the network model in the previous epoch as described above, the set value of the batch size may be smaller than the value set in the previous epoch.

With the above-described function provided by the learning unit 120 according to the present embodiment, the value of the batch size may be automatically increased or decreased based on a loss or an epoch, and the number of parameter updates may be effectively reduced while the divergence of the learning is avoided.

Furthermore, the batch size may be increased or decreased based on a loss and an epoch as described above by using, for example, a training script TS2 illustrated in FIG. 12. Moreover, in FIG. 12, pseudo codes are illustrated.

In the case of the example illustrated in FIG. 12, the training script TS2 first invokes the loss gradient calculation module CM illustrated in FIG. 9 and compares loss_grad acquired as a return value with a threshold. Here, when loss_grad falls below the threshold, the training script TS2 starts to automatically increase the batch size.

Then, the training script TS2 determines whether the loss has become large by more than a threshold as compared with that in the previous epoch. Here, when an increase in the loss is recognized, the training script TS2 stops the automatic increase in the batch size.

Furthermore, at this time, the training script TS2 reloads the DNN network model in the previous epoch.

<<1.4. Implementation Technique for Increasing/Decreasing the Batch Size>>

Next, the implementation technique for increasing/decreasing the batch size according to the present embodiment is described in detail. The batch size change unit 140 according to the present embodiment acquires the value of the batch size set by the learning unit 120 and controls a GPU (Graphics Processing Unit) based on the value so as to increase or decrease the batch size.

For example, the batch size change unit 140 according to the present embodiment may reconstruct a model in the GPU so as to control an increase/decrease in the batch size.

Figure 13:
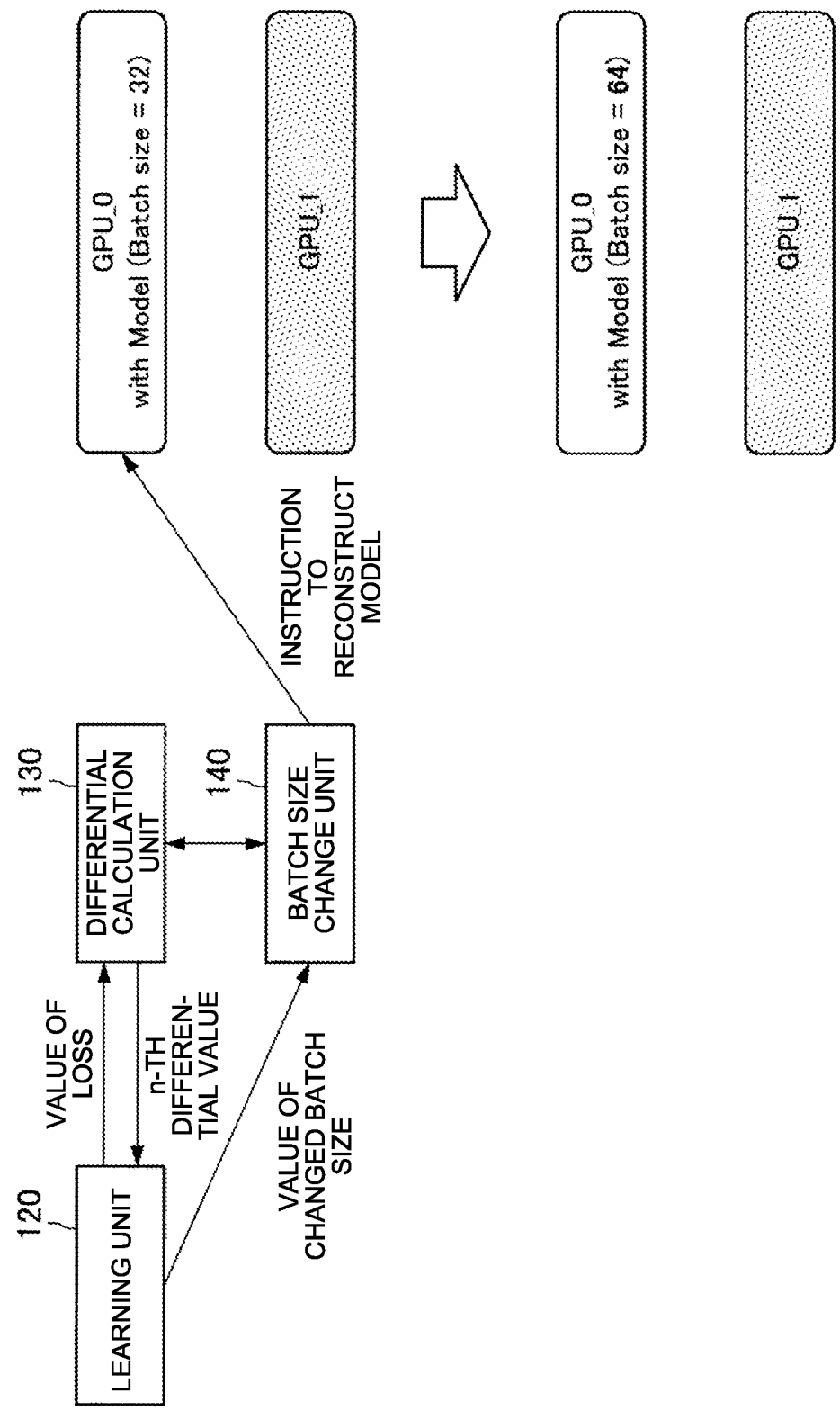
FIG. 13 is a diagram illustrating the reconstruction of a model in a GPU by a batch size change unit according to the embodiment.

FIG. 13 is a diagram illustrating the reconstruction of a model in the GPU by the batch size change unit 140 according to the present embodiment. In this case, first, the learning unit 120 inputs the value of the loss to the differential calculation unit 130 and acquires the n-th partial value of the value. Further, the learning unit 120 determines the value of the changed batch size based on the acquired n-th partial value and inputs the value of the batch size to the batch size change unit 140.

Then, the batch size change unit 140 according to the present embodiment instructs the GPU, which is currently used for learning, to reconstruct a model based on the input value of the batch size.

Here, in an example of the case illustrated in FIG. 13, out of GPU_0 and GPU_1, GPU_0 is currently used for learning, and when the batch size of the model in GPU_0 is 32, the batch size change unit 140 instructs GPU_0 to reconstruct a model so as to change the batch size of the model to 64.

Due to the above-described control by the batch size change unit 140 according to the present embodiment, the batch size may be globally increased without being affected by the number of GPUs included in the information processing apparatus 10, and the parallel computing capability of the GPUs may be utilized so that the effect that results in further speeding-up is described.

Furthermore, for example, the batch size change unit 140 according to the present embodiment may increase or decrease the number of loops for calculation regarding learning so as to control the increase or decrease in the batch size. The above-described technique is also referred to as accum-grad.

Figure 14:
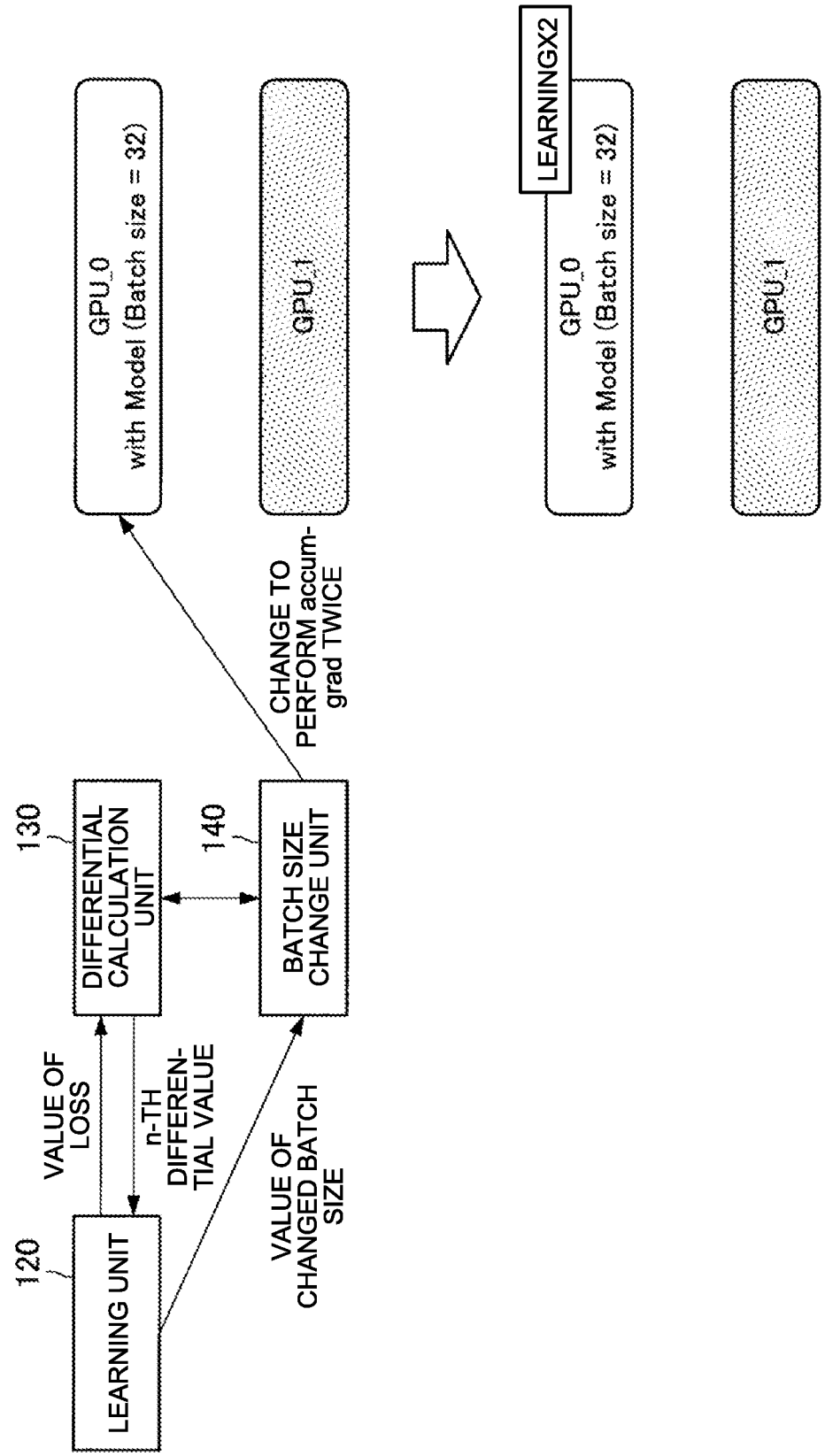
FIG. 14 is a diagram illustrating the control on the increase or decrease in the number of calculation loops by the batch size change unit according to the embodiment.

FIG. 14 is a diagram illustrating the control on the increase or decrease in the number of calculation loops by the batch size change unit 140 according to the present embodiment. In this case, the batch size change unit 140 according to the present embodiment instructs the GPU, which is currently used for learning, to change the number of calculation loops based on the value of the batch size input from the learning unit 120.

Furthermore, in the example of the case illustrated in FIG. 14, out of GPU_0 and GPU_1, GPU_0 is currently used for learning, and when the batch size of the model in GPU_0 is 32, the batch size change unit 140 instructs GPU_0 to perform accum-grad twice so that the learning with the batch size of 32 is performed twice.

With the above-described control by the batch size change unit 140 according to the present embodiment, the batch size may be increased without limitation due to the number of GPUs or the memory capacity, and because of a reduction in the number of times a synchronization process is performed, the speed of the learning may be increased by a reduction in the number of times a synchronization process is performed.

Furthermore, for example, the batch size change unit 140 according to the present embodiment may increase or decrease the number of GPUs used for learning to control the increase or decrease in the batch size.

Figure 15:
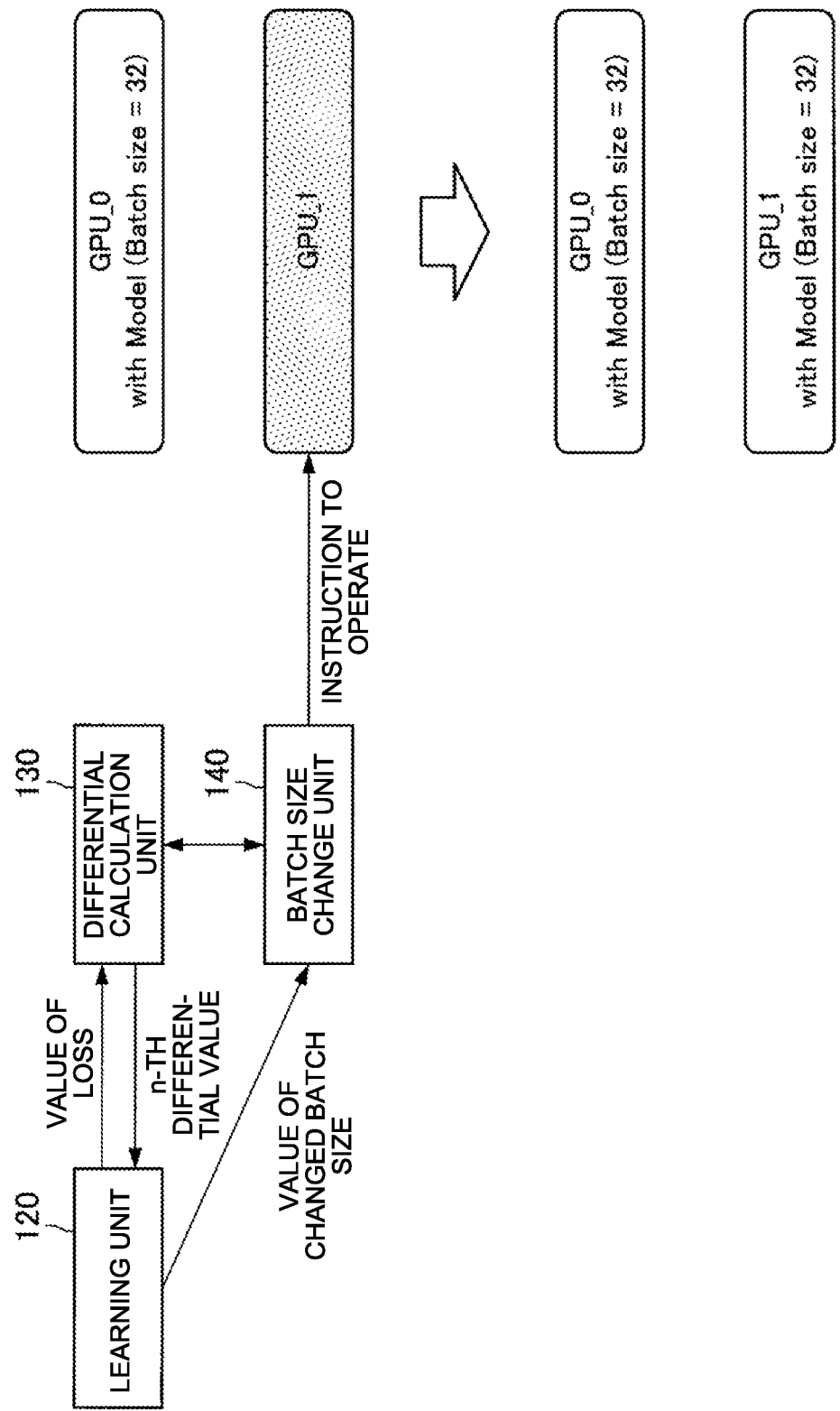
FIG. 15 is a diagram illustrating the control on the increase or decrease in the number of GPUs used by the batch size change unit according to the embodiment.

FIG. 15 is a diagram illustrating the control on the increase or decrease in the number of GPUs used by the batch size change unit 140 according to the present embodiment. In this case, the batch size change unit 140 according to the present embodiment instructs the GPU that is not currently used for learning to operate based on the value of the batch size input from the learning unit 120.

Furthermore, in the example of the case illustrated in FIG. 15, the batch size change unit 140 instructs GPU_1 to operate when, out of GPU_0 and GPU_1, only GPU_0 is currently used for learning.

With the above-described control by the batch size change unit 140 according to the present embodiment, the calculation resources are increased so that the speed of learning may be accordingly increased.

The method for controlling a change in the batch size by the batch size change unit 140 according to the present embodiment has been described above. Furthermore, the batch size change unit 140 according to the present embodiment may select the method for controlling a change in the batch size based on, for example, the level of priority as illustrated in FIG. 16 so as to further increase the effect of speeding-up due to an increase in the batch size.

Figure 16:
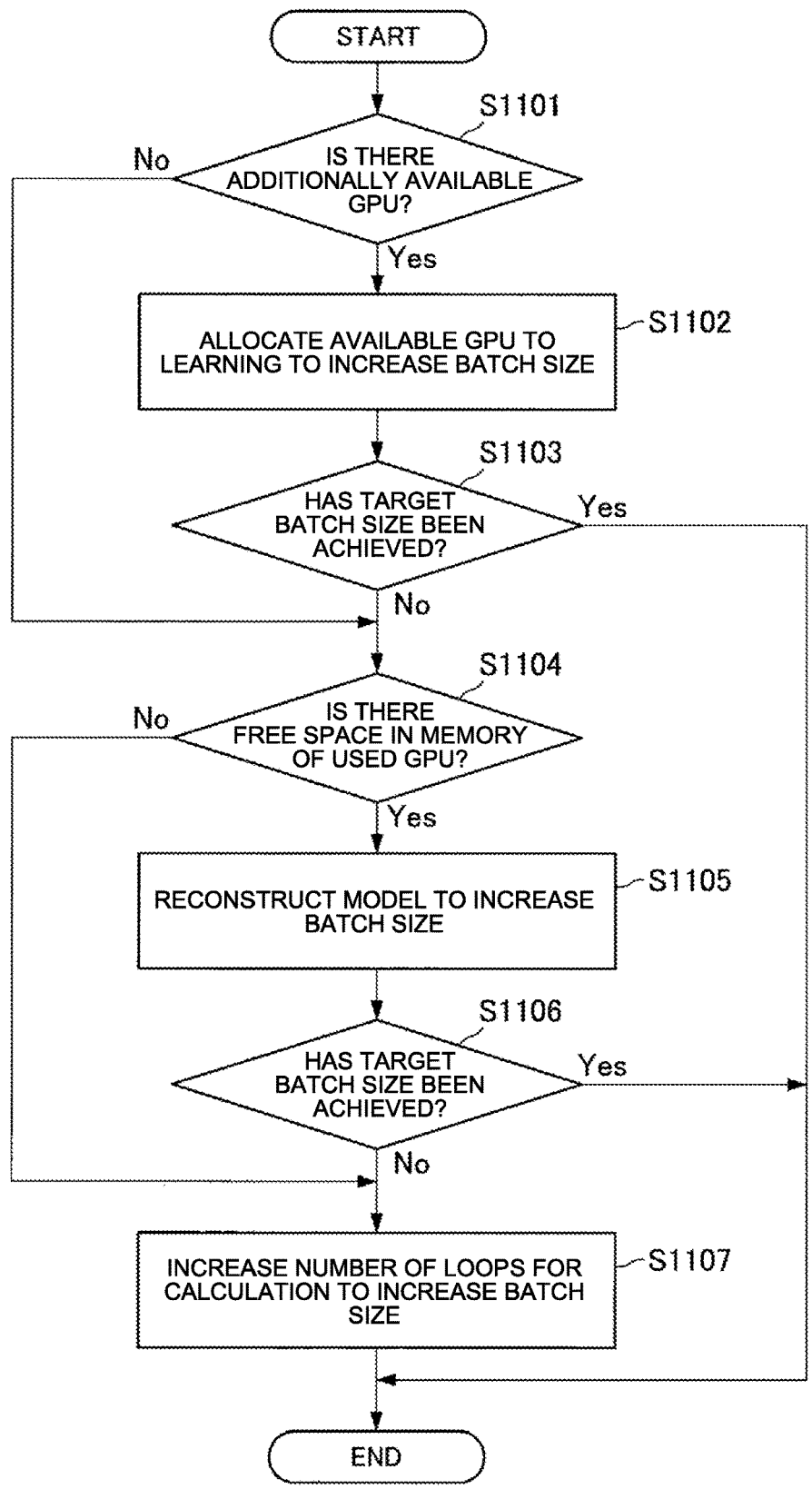
FIG. 16 is a flowchart illustrating the flow of the control by the batch size change unit according to the embodiment.

FIG. 16 is a flowchart illustrating the flow of the control by the batch size change unit 140 according to the present embodiment.

With reference to FIG. 16, the batch size change unit 140 first determines whether there is an additionally available GPU (S1101).

Here, when there is an additionally available GPU (S1101: Yes), the batch size change unit 140 allocates the available GPU to learning so as to control the increase in the batch size (S1102).

Then, the batch size change unit 140 determines whether the target batch size has been achieved due to the process at Step S1102 (S1103).

Here, when the target batch size has been achieved (S1103: Yes), the batch size change unit 140 terminates the process regarding the batch size change.

Conversely, when the target batch size has not been achieved (S1103: No), or when there is no additionally available GPU (S1101: No), the batch size change unit 140 determines whether there is a free space in the memory of the currently used GPU (S1104).

Here, when there is a free space in the memory of the currently used GPU (S1104: Yes), the batch size change unit 140 reconstructs the model in the currently used GPU so as to control the increase in the batch size (S1105).

Then, the batch size change unit 140 determines whether the target batch size has been achieved due to the process at Step S1105 (S1106).

Here, when the target batch size has been achieved (S1106: Yes), the batch size change unit 140 terminates the process regarding the batch size change.

Conversely, when the target batch size has not been achieved (S1106: No) or when there is no free space in the memory of the currently used GPU (S1104: No), the batch size change unit 140 increases the number of loops for calculation regarding the learning so as to control the increase in the batch size (S1107) and terminates the process regarding the batch size change.

2. Example of Hardware Configuration

Figure 17:
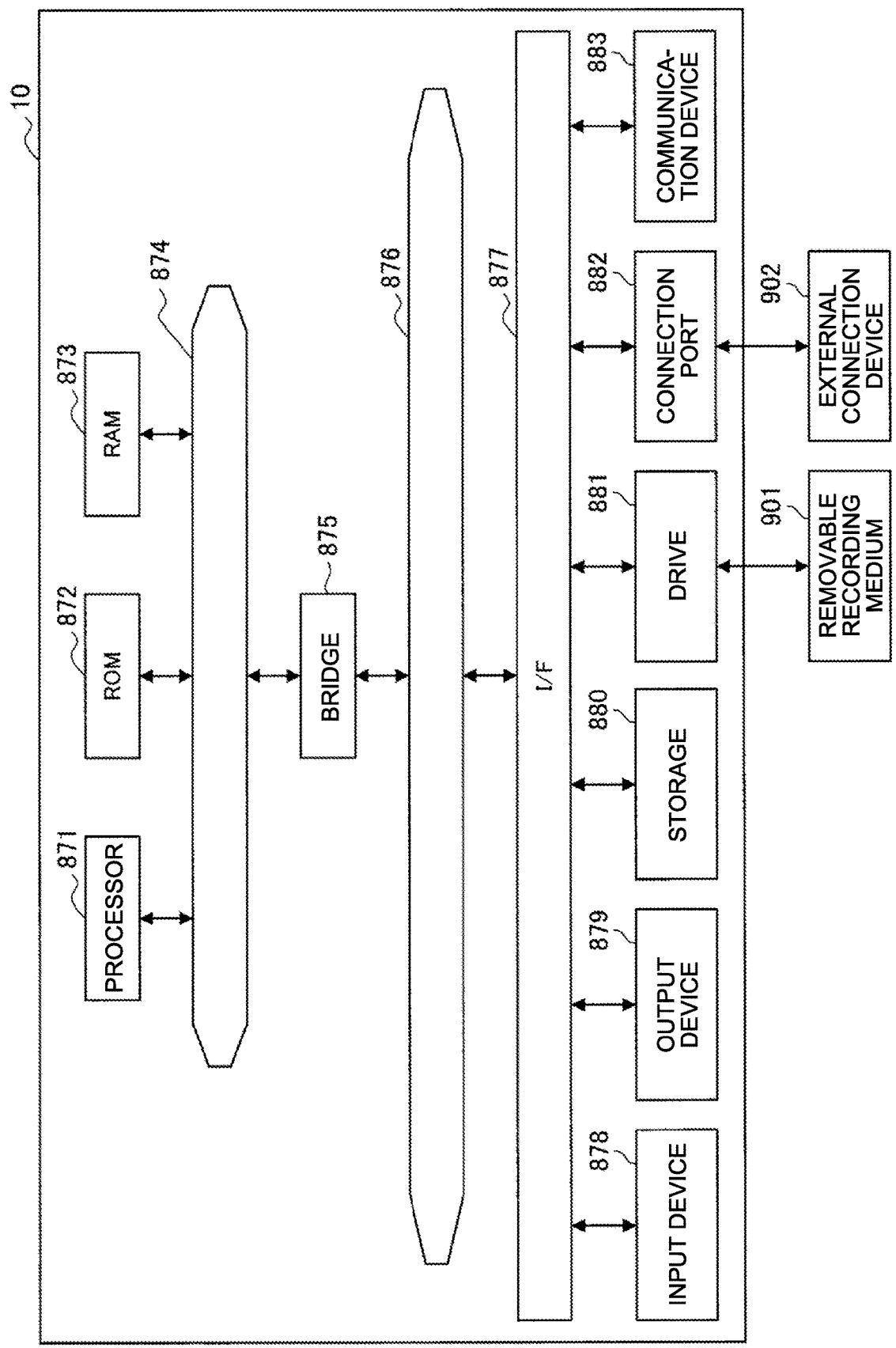
FIG. 17 is a diagram illustrating an example of the hardware configuration according to an embodiment of the present disclosure.

Next, an example of the hardware configuration of the information processing apparatus 10 according to an embodiment of the present disclosure is described. FIG. 17 is a block diagram illustrating an example of the hardware configuration of the information processing apparatus 10 according to an embodiment of the present disclosure. With reference to FIG. 17, the information processing apparatus 10 includes, for example, a processor 871, a ROM 872, a RAM 873, a host bus 874, a bridge 875, an external bus 876, an interface 877, an input device 878, and an output device 879, a storage 880, a drive 881, a connection port 882, and a communication device 883. Furthermore, the hardware configuration illustrated here is an example, and some of the components may be omitted. Moreover, components other than the components illustrated here may be further included.

(The Processor 871)

The processor 871 functions as, for example, an arithmetic processing device or a control device to control all or part of the operation of each component based on various programs recorded in the ROM 872, the RAM 873, the storage 880, or a removable recording medium 901. The processor 871 includes, for example, a GPU and a CPU. Furthermore, the information processing apparatus 10 according to an embodiment of the present disclosure includes at least two GPUs.

(The ROM 872, the RAM 873)

The ROM 872 is a means for storing a program read by the processor 871, data used for calculation, and the like. The RAM 873 temporarily or permanently stores, for example, a program read by the processor 871 and various parameters that are changed as appropriate when the program is executed.

(The Host Bus 874, the Bridge 875, the External Bus 876, the Interface 877)

The processor 871, the ROM 872, and the RAM 873 are connected to one another, for example, via a host bus 874 that enables high-speed data transmission. Furthermore, the host bus 874 is connected to, for example, the external bus 876 having a relatively low data transmission speed via the bridge 875. Furthermore, the external bus 876 is connected to various components via the interface 877.

(The Input Device 878)

As the input device 878, for example, a mouse, a keyboard, a touch panel, a button, a switch, or a lever is used. Further, as the input device 878, a remote controller (hereinafter, remote) capable of transmitting a control signal using infrared rays or other radio waves may be used. Moreover, the input device 878 includes a voice input device such as a microphone.

(The Output Device 879)

The output device 879 is a device that may visually or audibly notify the user of acquired information, such as a display device such as a CRT (Cathode Ray Tube), an LCD or an organic EL, an audio output device such as a speaker or a headphone, a printer, a mobile phone, or a facsimile. Furthermore, the output device 879 according to the present disclosure includes various vibration devices that are capable of outputting a tactile stimulus.

(The Storage 880)

The storage 880 is a device that stores various types of data. As the storage 880, for example, a magnetic storage device such as a hard disk drive (HDD), a semiconductor storage device, an optical storage device, or a magneto-optical storage device, is used.

(The Drive 881)

The drive 881 is a device that reads information recorded in the removable recording medium 901, such as a magnetic disk, an optical disk, a magneto-optical disk, or a semiconductor memory, or writes information in the removable recording medium 901.

(The Removable Recording Medium 901)

The removable recording medium 901 is, for example, DVD media, Blu-ray (registered trademark) media, HD DVD media, or various semiconductor storage media. It is obvious that the removable recording medium 901 may be, for example, an IC card including a non-contact type IC chip mounted therein or an electronic device.

(The Connection Port 882)

The connection port 882 is, for example, a USB (Universal Serial Bus) port, an IEEE1394 port, an SCSI (Small Computer System Interface), an RS-232C port, or a port for connecting an external connection device 902 such as an optical audio terminal.

(The External Connection Device 902)

The external connection device 902 is, for example, a printer, a portable music player, a digital camera, a digital video camera, or an IC recorder.

(The Communication Device 883)

The communication device 883 is a communication device for connecting to a network, e.g., a communication card for wired or wireless LAN, Bluetooth (registered trademark), or WUSB (Wireless USB), a router for optical communication, a router for ADSL (Asymmetric Digital Subscriber Line), or a modem for various communications.

3. Conclusion

As described above, one of the features of the information processing apparatus 10 according to an embodiment of the present disclosure is that it includes the learning unit 120 that executes learning using a neural network and the learning unit 120 dynamically changes the value of the batch size during learning based on the gap value with the ideal state for learning output from the neural network. With this configuration, it is possible to effectively speed up the learning using the DNN regardless of the learning technique.

Although preferred embodiments of the present disclosure have been described above in detail with reference to the accompanying drawings, the technical scope of the present disclosure is not limited to the examples. It is apparent that a person skilled in the art according to the present disclosure may arrive at various changes or modifications within the scope of the technical idea described in the claims, and it is naturally understood that they also belong to the technical scope of the present disclosure.

Furthermore, the advantages described in this description are merely for descriptive or illustrative purposes and not for restrictive purposes. That is, the technology according to the present disclosure may produce other advantages that are obvious to those skilled in the art from the details in this description in addition to the above-described advantages or instead of the above-described advantages.

Furthermore, it is possible to generate a program for causing the hardware, such as a CPU, a ROM, and a RAM built in the computer, to provide the function that is equivalent to the configuration included in the information processing apparatus 10, and it is also possible to provide a computer-readable non-transitory recording medium having the program recorded therein.

Furthermore, each step related to the process of the information processing apparatus 10 in this description does not necessarily need to be performed in chronological order according to the order described in the flowchart.

For example, each step related to the process of the information processing apparatus 10 may be performed in an order different from the order described in the flowchart or may be performed in parallel.

Furthermore, the following configuration also belongs to the technical scope of the present disclosure.

(1)

An information processing apparatus comprising a learning unit that executes learning using a neural network, wherein the learning unit dynamically changes a value of a batch size during learning based on a gap value with an ideal state for learning output from the neural network.

(2)

The information processing apparatus according to (1), wherein the gap value with the ideal state includes at least a loss.

(3)

The information processing apparatus according to (2), wherein the learning unit increases the value of the batch size during learning when convergence of learning is expected based on the loss.

(4)

The information processing apparatus according to (3), wherein the learning unit increases the value of the batch size during learning based on an n-th differential value of the loss.

(5)

The information processing apparatus according to (4), wherein the learning unit increases the value of the batch size during learning based on whether at least any of the value of the loss and a gradient of the loss falls below a threshold.

(6)

The information processing apparatus according to any one of (2) to (5), wherein the learning unit decreases the value of the batch size during learning when divergence of learning is expected based on the loss.

(7)

The information processing apparatus according to any one of (1) to (6), wherein the learning unit dynamically changes the value of the batch size based on an epoch.

(8)

The information processing apparatus according to (7), wherein the learning unit increases the value of the batch size due to progress of epochs.

(9)

The information processing apparatus according to (8), wherein, when divergence of learning is expected based on the gap value with the ideal state, the learning unit reloads a network model in a previous epoch.

(10)

The information processing apparatus according to (9), wherein, when the network model in the previous epoch is reloaded, the learning unit sets a value of the batch size smaller than a value set in the previous epoch.

(11)

The information processing apparatus according to (7), wherein the learning unit increases the value of the batch size in each epoch.

(12)

The information processing apparatus according to any one of (1) to (11), further comprising a batch size change unit that controls an increase or decrease in the batch size based on a value set by the learning unit.

(13)

The information processing apparatus according to (12), wherein the batch size change unit reconstructs a model in a GPU to control an increase or decrease in the batch size.

(14)

The information processing apparatus according to (12) or (13), wherein the batch size change unit increases or decreases a number of calculation loops for learning to control an increase or decrease in the batch size.

(15)

The information processing apparatus according to any one of (12) to (14), wherein the batch size change unit increases or decreases a number of GPUs used for learning to control an increase or decrease in the batch size.

(16)

The information processing apparatus according to any one of (12) to (15), wherein, when there is an additionally available GPU, the batch size change unit allocates the GPU to learning to control an increase in the batch size.

(17)

The information processing apparatus according to any one of (12) to (16), wherein, when there is no additionally available GPU and there is a free space in a memory of a currently used GPU, the batch size change unit reconstructs a model in the currently used GPU to control an increase in the batch size.

(18)

The information processing apparatus according to any one of (12) to (17), wherein, when there is no free space in a memory of a currently used GPU, the batch size change unit increases a number of calculation loops for learning to control an increase in the batch size.

(19)

The information processing apparatus according to (1), wherein the gap value with the ideal state includes at least any of a training error and a validation error.

(20)

An information processing method comprising executing, by a processor, learning using a neural network, wherein the learning further includes dynamically changing a value of a batch size during learning based on a gap value with an ideal state for learning output from the neural network.

REFERENCE SIGNS LIST

10 INFORMATION PROCESSING APPARATUS
110 INPUT/OUTPUT CONTROL UNIT
120 LEARNING UNIT
130 DIFFERENTIAL CALCULATION UNIT
140 BATCH SIZE CHANGE UNIT

The invention claimed is:

1. An information processing apparatus, comprising:
a memory; and
processing circuitry configured to execute learning using a neural network, wherein
the processing circuitry is further configured to dynamically change a value of a batch size during learning based on a gap value with an ideal state for learning output from the neural network, by controlling an increase or decrease in the batch size based on a value set by the processing circuitry, the controlling being performed by either
increasing or decreasing a number of calculation loops for learning to control an increase or decrease in the batch size, or
increasing or decreasing a number of GPUs used for learning to control an increase or decrease in the batch size.

2. The information processing apparatus according to claim 1, wherein the gap value with the ideal state includes at least a loss.

3. The information processing apparatus according to claim 2, wherein the processing circuitry increases the value of the batch size during learning when convergence of learning is expected based on the loss.

4. The information processing apparatus according to claim 3, wherein the processing circuitry increases the value of the batch size during learning based on an n-th differential value of the loss.

5. The information processing apparatus according to claim 4, wherein the processing circuitry increases the value of the batch size during learning based on whether at least any of the value of the loss and a gradient of the loss falls below a threshold.

6. The information processing apparatus according to claim 2, wherein the processing circuitry decreases the value of the batch size during learning when divergence of learning is expected based on the loss.

7. The information processing apparatus according to claim 1, wherein the processing circuitry dynamically changes the value of the batch size based on an epoch.

8. The information processing apparatus according to claim 7, wherein the processing circuitry increases the value of the batch size due to progress of epochs.

9. The information processing apparatus according to claim 8, wherein, when divergence of learning is expected based on the gap value with the ideal state, the processing circuitry reloads a network model in a previous epoch.

10. The information processing apparatus according to claim 9, wherein, when the network model in the previous epoch is reloaded, the processing circuitry sets a value of the batch size smaller than a value set in the previous epoch.

11. The information processing apparatus according to claim 7, wherein the processing circuitry increases the value of the batch size in each epoch.

12. The information processing apparatus according to claim 1, wherein the processing circuitry reconstructs a model in a GPU to control an increase or decrease in the batch size.

13. An information processing apparatus, comprising:
a memory; and
processing circuitry configured to execute learning using a neural network, wherein
the processing circuitry is further configured to dynamically change a value of a batch size during learning based on a gap value with an ideal state for learning output from the neural network, by controlling an increase or decrease in the batch size based on a value set by the processing circuitry, and
when there is an additionally available GPU, the processing circuitry allocates the GPU to learning to control an increase in the batch size.

14. An information processing apparatus, comprising:
a memory; and
processing circuitry configured to execute learning using a neural network, wherein
the processing circuitry is further configured to dynamically change a value of a batch size during learning based on a gap value with an ideal state for learning output from the neural network, by controlling an increase or decrease in the batch size based on a value set by the processing circuitry, and
when there is no additionally available GPU and there is a free space in a memory of a currently used GPU, the processing circuitry reconstructs a model in the currently used GPU to control an increase in the batch size.

15. The information processing apparatus according to claim 1, wherein, when there is no free space in a memory of a currently used GPU, the processing circuitry increases a number of calculation loops for learning to control the increase in the batch size.

16. The information processing apparatus according to claim 1, wherein the gap value with the ideal state includes at least any of a training error and a validation error.

* * * * *